US005508690A

United States Patent [19]

Shur et al.

[11] Patent Number: 5,508,690
[45] Date of Patent: Apr. 16, 1996

[54] PROGRAMMABLE DATA ALARM

[75] Inventors: Kenneth J. Shur, Clearwater; Karen L. Trapane, St. Petersburg, both of Fla.

[73] Assignee: E-Systems, Inc., Dallas, Tex.

[21] Appl. No.: 193,520

[22] Filed: Feb. 8, 1994

Related U.S. Application Data

[63] Continuation of Ser. No. 928,764, Aug. 17, 1992, abandoned, which is a continuation of Ser. No. 654,519, Feb. 13, 1991, abandoned.

[51] Int. Cl.⁶ ..................................... H04Q 1/00
[52] U.S. Cl. ............... 340/825.16; 340/825.36; 340/825.37; 340/505; 379/57; 379/165
[58] Field of Search ............... 340/825.06, 825.36, 340/825.37, 825.44, 825.52, 505, 506, 507, 657, 825.16; 379/57, 165

[56] References Cited

U.S. PATENT DOCUMENTS

| | | | |
|---|---|---|---|
| 3,337,992 | 8/1967 | Tolson | 340/825.06 |
| 3,713,142 | 1/1973 | Getchell | 340/505 |
| 4,383,257 | 5/1983 | Grallanza et al. | 340/825.44 |
| 4,417,246 | 11/1983 | Agnor et al. | 340/825.44 |
| 4,438,433 | 3/1984 | Smoot et al. | 340/825.44 |
| 4,493,043 | 1/1985 | Forbath . | |
| 4,644,351 | 2/1987 | Zabarsky et al. | 340/825.44 |
| 4,660,679 | 4/1987 | Ostrobrod . | |
| 4,680,785 | 7/1987 | Akiyama et al. | 379/57 |
| 4,812,819 | 3/1989 | Corsberg . | |
| 4,823,377 | 4/1989 | Sugiura et al. | 379/165 |
| 4,849,750 | 7/1989 | Andros et al. | 340/825.44 |
| 4,864,519 | 9/1989 | Appleby et al. | 340/825.36 |
| 5,073,767 | 12/1991 | Holmes | 340/825.44 |

OTHER PUBLICATIONS

Evercom External modems, owners manual and reference guide. p. 30, 31 1987.

*Primary Examiner*—Brian Zimmerman
*Attorney, Agent, or Firm*—Harold E. Meier

[57] ABSTRACT

A programmable data alarm containing a dedicated microprocessor serially interfaced with a data communications network is configured to monitor the network's data transmission lines for transmission of preselected characters. A number of preselected character strings may be input into the data alarm through data terminals coupled to the communications network and stored in a non-volatile memory. The microprocessor compares each character string transmitted over the communications network to the stored preselected character strings and outputs an audible and visual alarm signal when a match between the transmitted and stored strings occurs. The microprocessor may also be configured to monitor the handshake lines of the data communications network for signal transitions that will trigger the alarm signal.

7 Claims, 3 Drawing Sheets

PROGRAMMABLE DATA ALARM

This application is a continuation of U.S. application Ser. No. 07/928,764 filed Aug. 17, 1992, now abandoned, which is a continuation of Ser. No. 07/654,519, filed Feb. 13, 1991, now abandoned.

TECHNICAL FIELD

This invention relates to an apparatus for monitoring a communications network for the transmission of a preselected signal, and in particular to an apparatus serially interfaced with a data terminal and a communications network to monitor the network for the transmission of a preselected character string and, upon detection of the preselected character string, output an audible and visual alarm.

BACKGROUND OF THE INVENTION

Personal data terminals ("PDTs") are an indispensable component in computer communications networks. In such systems, a number of PDTs are interfaced with data communications equipment (DCE), for example, a modem, mainframe computer or data communications network, thereby allowing individual PDT operators ("users") to monitor and access data from the DCE. Often the PDTs are placed in busy, noisy environments. In such environments, important messages transmitted over the DCE network may be missed by a PDT user who is distracted or otherwise not able to attentively monitor the PDT. Accordingly, there is a need for an apparatus that will automatically monitor the network and notify the user of important message transmissions.

SUMMARY OF THE INVENTION

The present invention solves the foregoing problems and other problems by providing a programmable data alarm to be interfaced with a PDT and its associated computer network. The programmable data alarm will monitor the network for the transmission of a preselected character string and upon detection of that string, output an alarm signal. In accordance with the broader aspects of the programmable data alarm, the apparatus is characterized by a dedicated microprocessor interfaced with a communications network and programmed to detect one or more stored preselected character strings.

In a typical application of the present invention, the microprocessor is serially interfaced with a computer communications network and one PDT. The serial interface, through which the microprocessor is coupled to the communications network and the PDT, enables the user to input and store one or more preselected character strings through the attached PDT. The interface further relays character strings transmitted over the network to the microprocessor for comparison to the stored preselected strings. It will be understood, however, that the programmable data alarm need not be interfaced to a PDT, but may monitor the network without PDT connection. If the character string detected by the interface matches the preselected string input into and stored by the microprocessor, the programmable data alarm will output an alert signal comprised of a visual (flashing light) and/or audible (buzzer) alarm.

Potential applications for the programmable data alarm include signaling the arrival of electronic mail, detecting system failures or emergencies, preventing unauthorized access, and activating computer controlled devices. Other advantages and applications deriving from the use of the programmable data alarm will readily suggest themselves to those skilled in the art from consideration of the following Detailed Description taken in conjunction with the accompanying Drawings.

BRIEF DESCRIPTION OF THE DRAWINGS

A complete understanding of the invention may be had by reference to the following Detailed Description when taken in conjunction with the accompanying Drawings wherein.

DETAILED DESCRIPTION OF THE DRAWINGS

Figure 1:
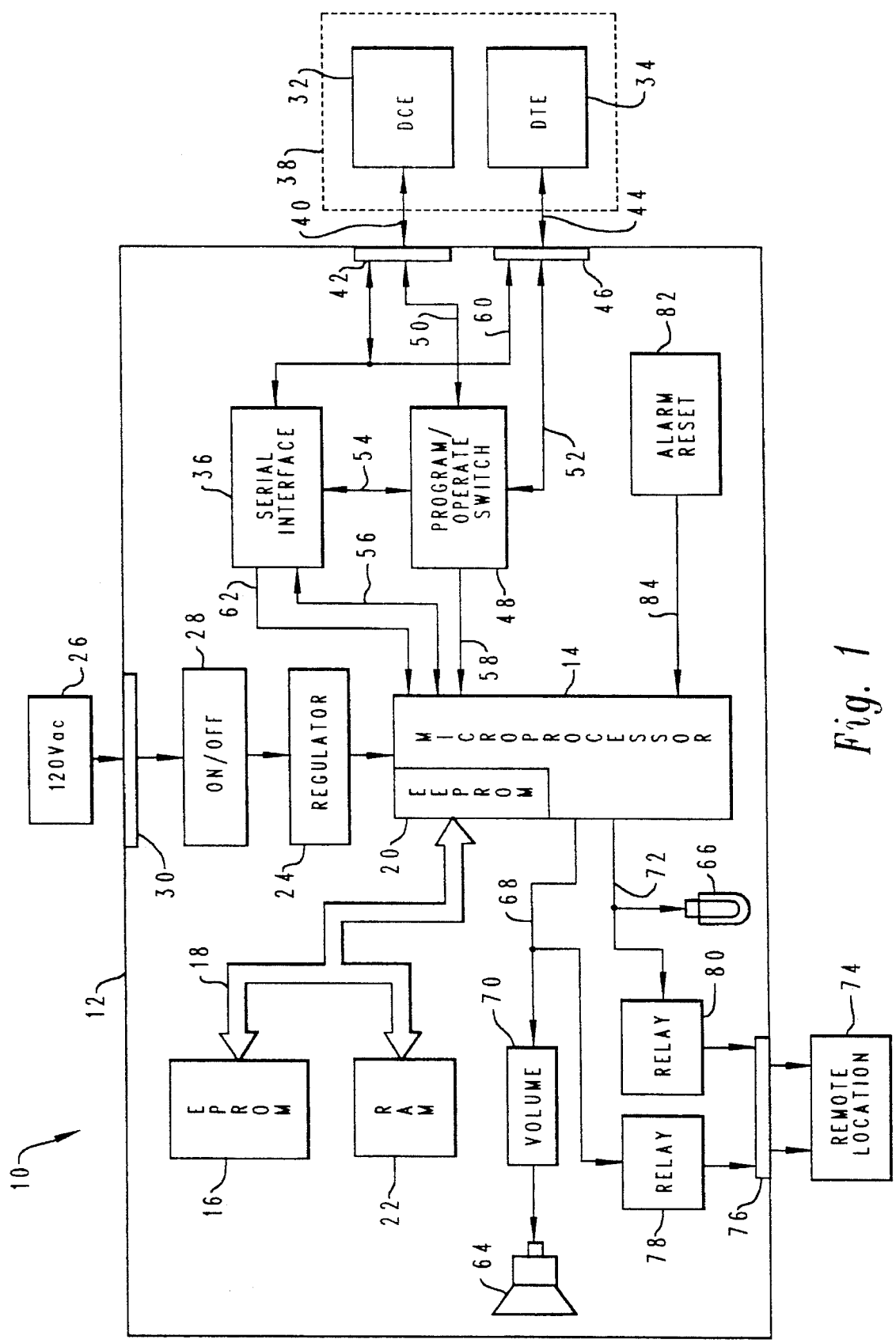
FIG. 1 is a block diagram of the programmable data alarm system.

Referring now to FIG. 1, there is shown the block diagram for a programmable data alarm 10 that will monitor a data communications network for character string transmission and output an alarm signal. The main operating components of the programmable data alarm 10 are enclosed within a housing 12. Within the housing 12, a microprocessor 14 handles all data processing and communications functions for the programmable data alarm including executing an alarm application program for inputting and storing a number of preselected character strings and monitoring the data communications network for string transmission. The application program for the programmable data alarm 10 is stored in an erasable-programmable read-only memory (EPROM) 16. EPROM 16 is connected to the microprocessor 14 through a data storage bus 18. Storage bus 18 enables the microprocessor 14 to access and execute the alarm application program.

The microprocessor 14 further includes an internal electrically erasable-programmable read-only memory (EEPROM) 20. The internal EEPROM 20 provides a nonvolatile memory area for storing a number of preselected character strings for comparison to network string transmissions during execution of the alarm application program. EEPROM 20 is also utilized for storing alarm parameters that govern alarm length and signal type. Use of a nonvolatile memory, such as the internal EEPROM 20, protects the stored strings and alarm parameters from loss in the event of a system power failure. An example of a microprocessor 14 containing an internal EEPROM 20 is the MC68HC11A1 CPU manufactured by Motorola.

A temporary, variable usage memory for the microprocessor 14 is provided by an external random access memory (RAM) 22. RAM 22 is also connected to the microprocessor 14 through data storage bus 18. In executing the alarm application program, the microprocessor 14 may utilize external RAM 22 for temporary storage and retrieval of program data and parameters.

Operating power for the programmable data alarm 10 is supplied by a voltage regulator 24 that converts the unregulated 115 Vac 60 Hz power supplied from a power input 26 to the 5 V DC supply needed to operate the microprocessor 14 and other components of the programmable data alarm 10. An on/off switch 28 controls the supply of unregulated voltage from power input 26 to the voltage regulator 24. A plug 30 attached to the housing 12 is used to connect the power input 26 to the programmable data alarm 10.

The microprocessor 14 for the programmable data alarm 10 may communicate with external data terminal equipment (DTE) 32 (for example, a PDT) and data communications equipment (DCE) 34 (for example, a mainframe computer) through a connected serial interface 36. The interconnection of a number of DTEs 32 and DCEs 34 forms a communications network, as generally indicated at 38. Use of an attached DTE 34 allows a user to input character strings into the alarm 10 through interface 36 in a manner to be described. Interface 36 is preferably an RS-232 serial interface that converts data signal levels between the EIA RS232 levels used for data transmission over the communications network 38 and the transistor-transistor logic levels used for data processing within the programmable data alarm 10.

DCE 32 is connected to the programmable data alarm 10 by means of a serial data transmission line 40 and a connector 42. Similarly, DTE 34 is connected to the programmable data alarm 10 by means of a serial data transmission line 44 and a connector 46. Each connector, 42 and 46, is mounted to the housing 12 for the programmable data alarm 10. Serial data transmission lines 40 and 44 provide a data communications channel between the network 38 and the programmable data alarm 10. It will be understood, however, that the programmable data alarm 10 need not be connected to a DTE 32 in order to monitor the communications network 38 for string transmission.

DCE 32 and DTE 34 are connected to serial interface 36 through a program/operate switch 48. Switch 48 is used to configure the microprocessor 14 for execution of the alarm application program in a manner to be described. Furthermore, the switch 48 controls data transmissions among and between DCE 32, DTE 34 and programmable data alarm 10. A pair of serial data transmission lines, 50 and 52, couple the DCE and DTE, 32 and 34 respectively, to the switch 48. Serial data transmission lines 54 and 56 allow data to be transmitted between the microprocessor 14 and switch 48 through interface 36.

When the program/operate switch 48 is set for "program" the switch disables data communication to and from DCE 32 over data transmission line 50, while enabling data communication between the microprocessor 14 and DTE 34 over data transmission lines 52, 54 and 56. Switch 48 signals the microprocessor 14 through line 58 that "program" mode has been selected. Upon detection over line 58 of a "program" mode selection, the microprocessor unit 14 is configured by the alarm application program to accept input data in the form of character strings from DTE 34 to be stored in EEPROM 20.

When the program/operate switch 48 is set for "operate", the switch enables data communication between DCE 32 and DTE 34 over data transmission lines 50 and 52. Thus, normal operating functions between DCE 32 and DTE 34 are not affected by the presence of the programmable data alarm 10. Furthermore, the switch enables the microprocessor 14 to monitor data communications between DCE 32 and DTE 34 over data transmission lines 50 and 52 through interface 36 and data transmission lines 54 and 56. Switch 48 signals the microprocessor 14 through line 58 that "operate" mode has been selected. Upon detection over line 58 of an "operate" mode selection, the microprocessor 14 is configured by the alarm application program to monitor all data communications (character string transmissions) over data transmission lines 50 and 52 for comparison to the character strings input by DTE 34 during "program" mode and stored in the internal EEPROM 20. If the string transmitted over lines 50 and 52 matches a string stored in the EEPROM 20, the microprocessor 14 will signal an alarm condition.

During "operate" mode, the microprocessor 14 may also be configured by the alarm application program to monitor the handshake line 60 between DCE 32 and DTE 34. Handshake line 60 carries the data terminal ready and data carrier detect signals over the network 38. The microprocessor 14 may monitor line 60 through interface 36 and line 62 for high-to-low signal transitions. If a high-to-low signal transition occurs while the microprocessor 14 is configured to monitor the handshake line 60, an alarm condition will be signaled.

The programmable data alarm 10 indicates an alarm condition by signaling either or both an audible and/or visual alarm. An included speaker 64 and light 66 are coupled to the microprocessor 14 in order to provide the audible and/or visual alarm signal. The alarm signal will be output by microprocessor 14 when either the character data string transmitted over data transmission lines 50 and 52 matches the character string stored in EEPROM 20 or the handshake line 60 goes from high-to-low depending on how the alarm application program has configured the microprocessor 14. After an alarm condition has been signaled by speaker 64 and light 66, the alarm may be terminated by depressing a reset switch 82 coupled to the microprocessor 14 through reset line 84.

Speaker 64 preferably comprises a piezo alarm that will produce a tone greater than 70 dB at 10 feet. Speaker 64 is connected to the microprocessor 14 through audio alarm output line 68. The volume level of the audible alarm signal produced by speaker 64 is adjustable through the use of a volume control 70. Light 66 connects to the microprocessor 14 through visual alarm line 72. Light 66 preferably comprises a light emitting diode (LED) or other illuminating device.

Alarm signals output on audio and visual output lines 68 and 72 may also be transmitted to signal an alarm condition at a remote location 74 external to the programmable data alarm 10. A connector 76 attached to the housing 12 of the programmable data alarm 10 couples the alarm indicators at the remote location 74 to the microprocessor 14 through a pair of control relay 78 and 80. Actuation of each control relays 78 and 80 is effectuated by the presence of alarm signals on output lines 68 and 72 respectively.

Figure 2:
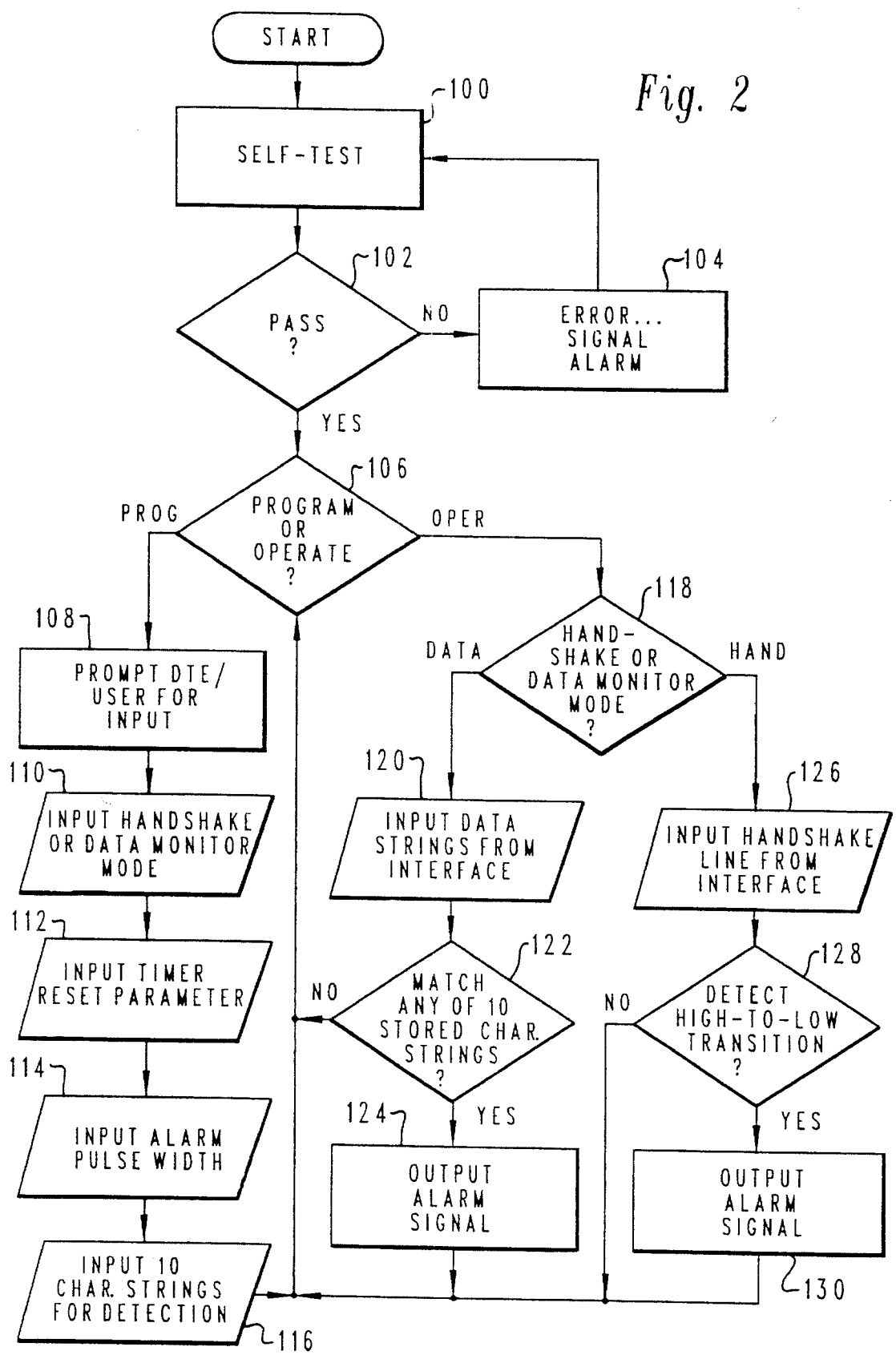
FIGS. 2 and 3 are flow diagrams illustrating two embodiments for the alarm application program used controlling operation of the programmable data alarm.
Figure 3:
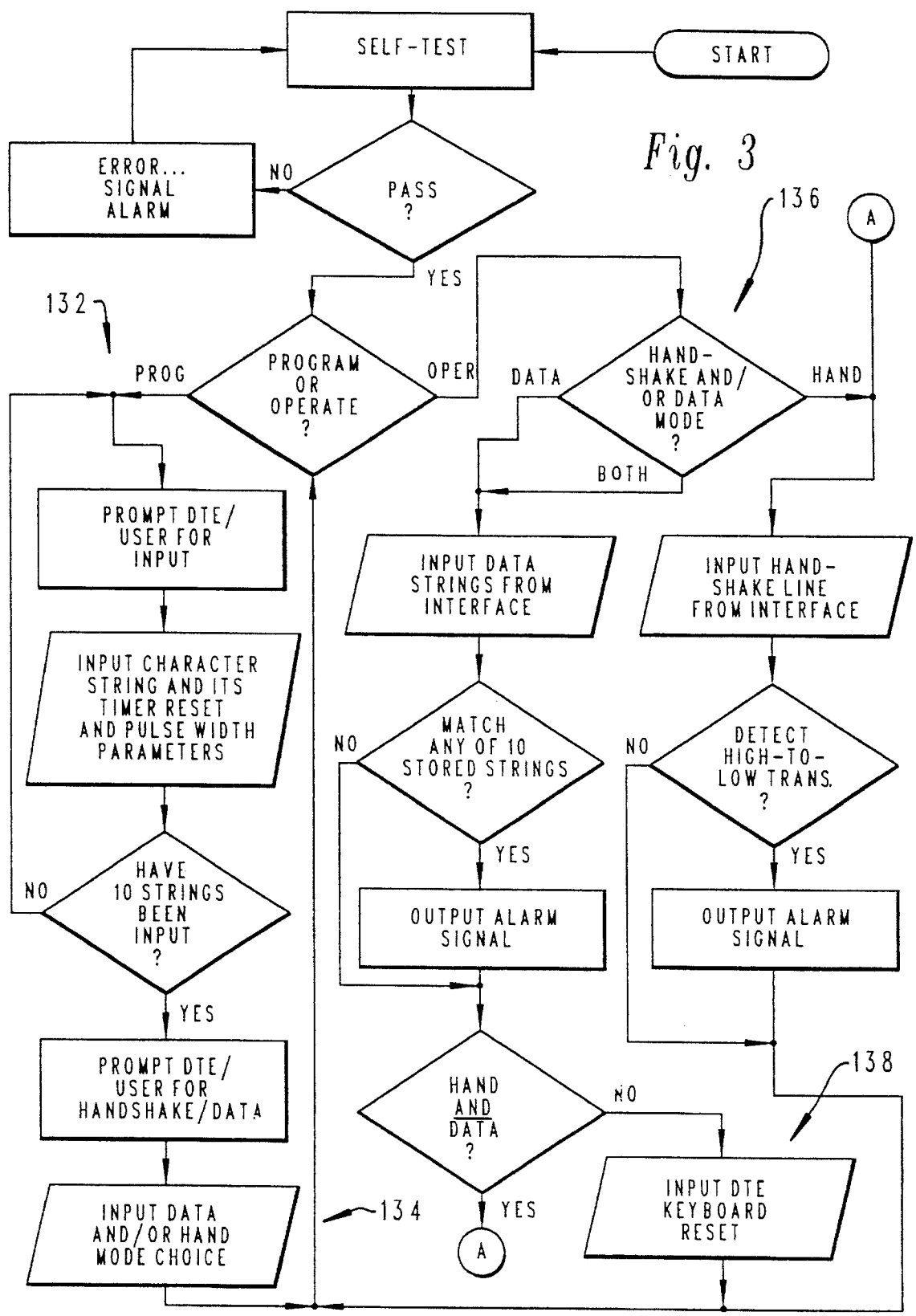

Referring now to FIGS. 1, 2 and 3, FIGS. 2 and 3 show flow charts for two embodiments of the alarm application program executed by the microprocessor 14 and stored within EPROM 16. The alarm application programs shown in FIGS. 2 and 3 perform two basic functions: first, to allow the system user to input, via an attached DTE 34, a set of preselected character strings for detection; and second, to monitor the communications network 38 for transmission of the preselected and stored character strings. Upon detection of the transmission of a preselected string, the alarm application program orders the microprocessor 14 to output through speaker 64 and light 66 an audible and/or visual alarm signal. The application program may also configure the microprocessor 14 to monitor handshake line 60 for a high-to-low signal transition and output an alarm signal when such a transition occurs.

Upon entering the first embodiment of the alarm application program as shown in FIG. 2, operating step 100 causes the microprocessor 14 to execute a built-in self test program to check all internal circuitry within the programmable data alarm 10. The results of the built-in self test are scanned during inquiry step 102 to determine if there is an internal circuitry error. If such an error exists (i.e., the self test is not passed), the alarm application program outputs an alarm signaling the system error by executing step 104.

If the built-in self test is passed, the alarm application program controls the microprocessor 14 to monitor line 58 to determine, during inquiry step 106, whether the user has chosen the "program" or "operate" mode through switch 48. If the user has chosen to "program" the programmable data alarm 10, the microprocessor 14 prompts the user of the DTE 34 for input data. This is accomplished by transmitting, over data transmission lines 56, 54 and 52, the prompting information for display on the DTE 34 screen. The user may then input, through the DTE 34, configuration data including handshake/data mode choice (input 110), timer reset parameter (input 112), alarm pulse width (input 114) and up to ten preselected character strings for matching (input 116). This data is stored in the internal EEPROM 20.

The handshake/data monitor mode input enables the user to choose to monitor the serial interface 36 for either high-to-low transitions over handshake line 60 ("handshake" mode) or to match network character string transmissions over data transmission lines 50 and 52 to the character strings input during step 116 and stored in EEPROM 20 ("data" mode). The timer reset parameter is used by microprocessor 14 to disable an activated alarm signal after the specified timer length expires. The alarm pulse width input determines the on and off pulse width for the audible and visual alarm signals transmitted to speaker 64 and light 66 signaling a character string match or a handshake signal transition. After all configuration data has been input and stored the program returns to program/operate inquiry 106.

If switch 48 has been set for "operate" mode, then the program accesses the configuration data stored in EEPROM 20 and determines, during inquiry 118, whether the user had input during step 110 a choice of "data" or "handshake" monitor mode. If the user had chosen "data" monitor mode, the alarm application program monitors, through interface 36 during input step 120, the character string transmissions over data transmission lines 50 and 52 and determines, during inquiry 122, whether the network character string transmission matches any of up to ten character strings input during step 116. If no such match occurs, the program recycles through program/operate inquiry 106.

If a match between the monitored and stored character strings occurs (satisfying inquiry 122), the program outputs an alarm signal through step 124 having an on and off pulse width as determined by input 114 and an alarm length as determined by input 112. While the alarm is being sounded, the program returns through program/operate inquiry 106 and data inquiry 118 to continue monitoring the network for matching character string transmissions.

If switch 48 has been set for "handshake" monitor mode, the program monitors, during input step 126 and interface 36, the handshake line 60. Inquiry step 138 tests for a high-to-low signal transition over handshake line 60 and, upon detection of such a transition, outputs an alarm signal having an on and off pulse width as determined by step 114 and a length as determined by step 112.

The alarm application program may be modified for a second embodiment as shown in FIG. 3 to allow the user to input timer reset and pulse width configuration data for each of the up to input character strings, as generally indicated at 132. This allows the user to program individual alarm signals for each of the stored character strings. In addition, the program may be modified to enable the programmable data alarm 10 to output an alarm signal when either a string match or handshake transition or both occurs, as generally indicated at 134 and 136. Furthermore, the program of FIG. 3 also includes an input and inquiry sequence indicated at 138 to allow for a DTE keyboard alarm reset in addition to the included hardware alarm reset switch 82. Thus, the terminal need not be in the same location as the housing 12 containing the programmable data alarm 10.

Although preferred embodiments for the programmable data alarm have been illustrated in the accompanying Drawings and described in the foregoing Detailed Description, it will be understood that the programmable data alarm is not limited to the embodiments disclosed but is capable of numerous rearrangements and modifications of parts and elements without departing from the scope of the invention.

We claim:

1. A programmable alarm to be interfaced with a data terminal in a computer network for monitoring the network for preselected character strings, comprising:

means for storing preselected character strings;

input means interfaced with a data terminal in a computer network for receiving strings transmitted over a communications link of the computer network;

a processor coupled to the means for storing character strings for comparing each character string received to each stored character string;

means coupled to the processor and the input means for responding to a user actuated input over the communications link and switching between an alarm programming mode wherein user preselected character strings are received from the communications link and stored in the means for storing and an alarm operating mode wherein character strings are received from the communications link of the computer network and compared to the stored preselected character strings; and means for outputting an alarm signal in response to a comparison between one of the character strings received from the communications link and one of the stored preselected character strings.

2. The programmable alarm as in claim 1 wherein the input means comprises:

interface means for monitoring the communications link for transmission of character strings.

3. The programmable alarm as in claim 1 wherein the input means comprises:

interface means for monitoring the communications link for handshake signals.

4. The programmable alarm as in claim 3 further including:

means for coupling the processor to the interface means for detecting a handshake signal on the communications link; and means for outputting the alarm signal in response to the detection of the handshake signal.

5. A programmable alarm to be interfaced with a data terminal in a computer network for monitoring the network for preselected character strings, comprising:

processor control means for selecting between an alarm programming mode and an alarm operating mode and for generating a mode selection signal indicative thereof;

storage means for storing preselected character strings;

means for interfacing the data terminal and the storage means with a communications link of the computer network;

means coupled to the interfacing means for transmitting received character strings from the communications link to the storage means wherein the means coupled to the interfacing means responds to a user actuated input of preselected character strings over the communications link;

a processor connected to the storage means and the means coupled to the interfacing means, said processor having first means responsive to the mode selection signal for operating the processor in the alarm programming mode to receive user preselected data strings transmitted from the communications link to the storage means and to store the user preselected character string in the storage means, and having second means responsive to the mode selection signal for operating the processor in the alarm operating mode to monitor the transmission of character strings over the communications link and compare each monitored character string transmitted over the communications link with each stored user preselected character string; and means for generating an alarm when a monitored character string matches a stored user preselected character string.

6. A programmable alarm to be interfaced with a data terminal in a computer network for monitoring the network for preselected character strings, comprising:

means for interfacing with the data terminal and a communications link of the computer network to receive both character string and handshake data strings transmitted thereon;

storage means for storing user preselected character strings;

means coupled to the means for interfacing for transmitting received user preselected character strings from the communications link to the storage means wherein the means for transmitting responds to a user actuated input transmitted over the communications link;

means responsive to an alarm signal for signalling an alarm; and a processor coupled to the means for interfacing, means for transmitting, said storage means and said means for signalling, said processor having:

means for receiving from the communications link in a first operating mode a transmitted alarm operation selection comprising a handshake data signal monitor selection or a character string data signal monitor selection; and means for monitoring character signal transmissions over the communications link via the means for interfacing in a second operating mode, said means for monitoring including: means responsive to the receipt of the string data signal monitor selection in the first operating mode for outputting the alarm signal when a character string matching one of the stored user preselected strings is transmitted over the communications link; and means responsive to the receipt of the handshake signal monitor selection in the first operating mode for outputting the alarm signal when a handshake data string is transmitted over the communications link.

7. The programmable alarm as in claim 6 wherein the processor further includes means for receiving string data signals transmitted by said configuring means from the communications link in the first operating mode and storing received string data signals in the means for storing.

* * * * *